(12) United States Patent
Bioret (10) Patent No.: US 11,044,887 B2
(45) Date of Patent: Jun. 29, 2021

(54) SYSTEM FOR THERMAL COMFORT OF ANIMALS IN A LIVESTOCK FARMING ENCLOSURE

(71) Applicant: BIORET AGRI-LOGETTE CONFORT, Nort sur Erdre (FR)

(72) Inventor: Jean-Vincent Bioret, Petit-Mars (FR)

(73) Assignee: BIORET AGRI-LOGETTE CONFORT, Nort sur Erdre (FR)

( * ) Notice: Subject to any disclaimer, the term of this patent is extended or adjusted under 35 U.S.C. 154(b) by 717 days.

(21) Appl. No.: 15/767,656

(22) PCT Filed: Oct. 12, 2016

(86) PCT No.: PCT/FR2016/052633
§ 371 (c)(1),
(2) Date: Apr. 12, 2018

(87) PCT Pub. No.: WO2017/064417
PCT Pub. Date: Apr. 20, 2017

(65) Prior Publication Data
US 2018/0295805 A1 Oct. 18, 2018

(30) Foreign Application Priority Data

Oct. 15, 2015 (FR) .................................. 1559804

(51) Int. Cl.
*A01K 1/015* (2006.01)
(52) U.S. Cl.
CPC .......... *A01K 1/0158* (2013.01); *A01K 1/0157* (2013.01)
(58) Field of Classification Search
CPC .. A01K 1/0158; A01K 1/0157; A01K 1/0353; F28F 21/062; A47C 21/048; A47C 27/085; A47G 9/1036

USPC ........................................................ 119/28.5
See application file for complete search history.

(56) References Cited

U.S. PATENT DOCUMENTS

| 4,018,271 A | * | 4/1977 | Jones | A01K 1/0158 165/175 |
| 4,252,082 A | * | 2/1981 | Herring | A01K 1/0158 119/508 |
| 4,254,737 A | * | 3/1981 | Herring | A01K 1/0227 119/508 |
| 5,092,271 A | * | 3/1992 | Kleinsasser | F28F 21/062 119/508 |

(Continued)

FOREIGN PATENT DOCUMENTS

| DE | 20 2008 008592 U1 | 10/2008 |
| FR | 2 672 966 A1 | 8/1992 |
| GB | 2 447 287 A | 9/2008 |

OTHER PUBLICATIONS

International Search Report, dated Feb. 16, 2017, from corresponding PCT/FR2016/052633 application.

*Primary Examiner* — Yvonne R Abbott-Lewis
(74) *Attorney, Agent, or Firm* — Nixon & Vanderhye (57) ABSTRACT

Disclosed is a system for thermal comfort of animal in a livestock farming enclosure, which includes: at least one comfort mattress which includes at least one resilient layer including a plurality of sealed cavities which are parallel to one another; a heat-transfer fluid, intended for filling the sealed cavities; a unit for generating a circulation of the heat-transfer fluid inside the sealed cavities; and optionally a unit for regulating the temperature of the heat-transfer fluid.

20 Claims, 3 Drawing Sheets

(56) References Cited

U.S. PATENT DOCUMENTS

| | | | |
|---|---|---|---|
| 6,491,717 B1 * | 12/2002 | Stanley | A01K 1/0157 607/104 |
| 8,225,749 B2 * | 7/2012 | Nilsson | A01K 1/0011 119/526 |
| 2011/0283952 A1 * | 11/2011 | Bruer | A01K 1/0158 119/448 |
| 2013/0291801 A1 * | 11/2013 | Throndsen | A01K 1/0157 119/28.5 |
| 2014/0374056 A1 * | 12/2014 | Choi | A01K 1/0158 165/46 |
| 2020/0344974 A1 * | 11/2020 | Bioret | A01K 1/0157 |

* cited by examiner

SYSTEM FOR THERMAL COMFORT OF ANIMALS IN A LIVESTOCK FARMING ENCLOSURE

TECHNICAL FIELD TO WHICH THE INVENTION RELATES

The present invention relates to a system for thermal comfort of animals, for example dairy cattle and beef cattle, in particular for the fitting out of stalls in a livestock enclosure.

TECHNOLOGICAL BACK-GROUND

The animal comfort is a determining parameter in the breeding efficiency.

This comfort influences in particular the health of the animals, the way they eat, the quantity of food they ingest as well as their fertility and longevity.

For that purpose, commonly, when in stable, the cattle have a rest individually in stalls, also commonly called "free stalls", in which they are free to stand up or lie down.

When carrying out these movements, the animals are liable to hurt themselves. This is in particular the case when the bedding is consisted of concrete covered with straw, which does not protect the animal against slide risks.

To limit this type of incident and the injuries that ensue therefrom, it is known to equip the ground of these stalls with mattresses adapted to improve the animal bedding comfort.

These comfort mattresses conventionally comprise at least one resilient layer that is adapted to undergo an elastic deformation, underlying an upper surface on which an animal rests.

The comfort also comprises a "thermal" component.

Indeed, in case of high heat or intense cold, the animals are liable to undergo a harmful phenomenon called "thermal stress".

Such a thermal stress results in particular in defense behaviour manifestations, a fall of the zootechnical performances, a deterioration of the breeding parameters and an increase of the pathologies.

Within this context, there exists a need for a system aiming at favoring the thermal comfort of the animals present in the livestock enclosure, in particular when they have a rest within their stalls.

OBJECT OF THE INVENTION

Within this context, the applicant has developed a system for thermal comfort of animals in a livestock enclosure, for example dairy cattle and beef cattle, comprising:
  (a) at least one comfort mattress that comprises at least one resilient layer and that has two opposite faces:
    an upper face, adapted to undergo an elastic deformation and including at least one accommodation area on which an animal is intended to rest, and
    a lower face, intended to rest on a receiving surface,
  wherein said at least one resilient layer includes several sealed cavities intended to contain a heat-transfer fluid,
  wherein said sealed cavities extend parallel, or at least approximately parallel, relative to each other,
  wherein said sealed cavities underlie at least one portion of said at least one accommodation area, and each include at least two through-orifices,
  (b) a heat-transfer fluid, intended to fill said sealed cavities,
  (c) means for generating a circulation of said heat-transfer fluid within each of said sealed cavities, between their respective through-orifices.

Such a system has hence for interest to allow a control of the temperature of the comfort mattress with which the animal is directly in contact.

This temperature is then adjusted as a function of the surrounding thermal conditions.

For example, in case of high temperatures, the comfort mattress may be refrigerated on surface, so as to cool down the animal present and hence limit the increase of the body temperature of the latter.

As an alternative or a complement, in case of cold temperatures, the comfort mattress may be heated so as to warm up the animal present.

It is hence possible to limit, or even eliminate, the risk of thermal stress for the animals present in the livestock enclosure.

Other non-limitative and advantageous characteristics of the thermal comfort system according to the invention, taken individually or according to any technically possible combination, are the followings:
  the sealed cavities each have an elongated rectilinear shape;
  said sealed cavities are distributed over at least one plane extending parallel to the faces of said at least one comfort mattress;
  said at least one resilient layer has two longitudinal edges, and said sealed cavities extend parallel, or at least approximately parallel, to said longitudinal edges; in this case, the sealed cavities comprise two peripheral sealed cavities that are juxtaposed along said longitudinal edges, and one at least of said peripheral sealed cavities advantageously includes transverse extensions, distributed over the length thereof, that extend perpendicular to the longitudinal axis of said peripheral sealed cavity and towards said juxtaposed longitudinal edge;
  said at least one resilient layer has two transverse edges; said sealed cavities each include two through-orifices each arranged at one of said transverse edges; and the means for generating a circulation of said heat-transfer fluid preferably consist of means for generating a parallel circulation within said sealed cavities, between said access orifices;
  the system comprises at least two of said accommodation areas, and said sealed cavities underlie a portion of each of said accommodation areas;
  said at least one resilient layer includes at least one sealed chamber, intended to contain a damping fluid and arranged between said sealed cavities and said upper face of said mattress, wherein said at least one resilient layer includes at least one through-orifice for the access to said at least one sealed chamber;
  said at least one resilient layer forms a film surrounding a comfort layer made of a resilient material;
  the comfort system also comprises means for regulating the temperature of said heat-transfer fluid; the heat regulation means are advantageously chosen among means adapted to heat up and/or cool down said heat-transfer fluid;
  said at least one resilient layer is made single-piece, said resilient layer defining directly said sealed cavities and, as the case may be, said at least one sealed chamber;
  the means for regulating the temperature of said heat-transfer fluid comprise means for measuring the temperature of said heat-transfer fluid and, possibly, means for displaying said measured temperature.

The present invention also relates to a livestock enclosure equipped with a comfort system according to the invention.

Preferably, this livestock enclosure comprises stalls; said at least one comfort mattress covers the ground of one at least of said stalls; and said at least one comfort mattress includes a plurality of sealed cavities that extend within at least one of said stalls.

The invention also relates to a method for improving the thermal comfort of the animals in a livestock enclosure according to the invention.

Said method comprises:
a circulation of the heat-transfer fluid within said sealed cavities of said at least one comfort mattress, and
a regulation of the temperature of said heat-transfer fluid, to regulate the temperature of the upper face of said at least one comfort mattress.

DETAILED DESCRIPTION OF THE INVENTION

The invention will be further illustrated, without being limited in anyway, by the following description of two particular embodiments in relation with the appended figures in which.

Figure 1:
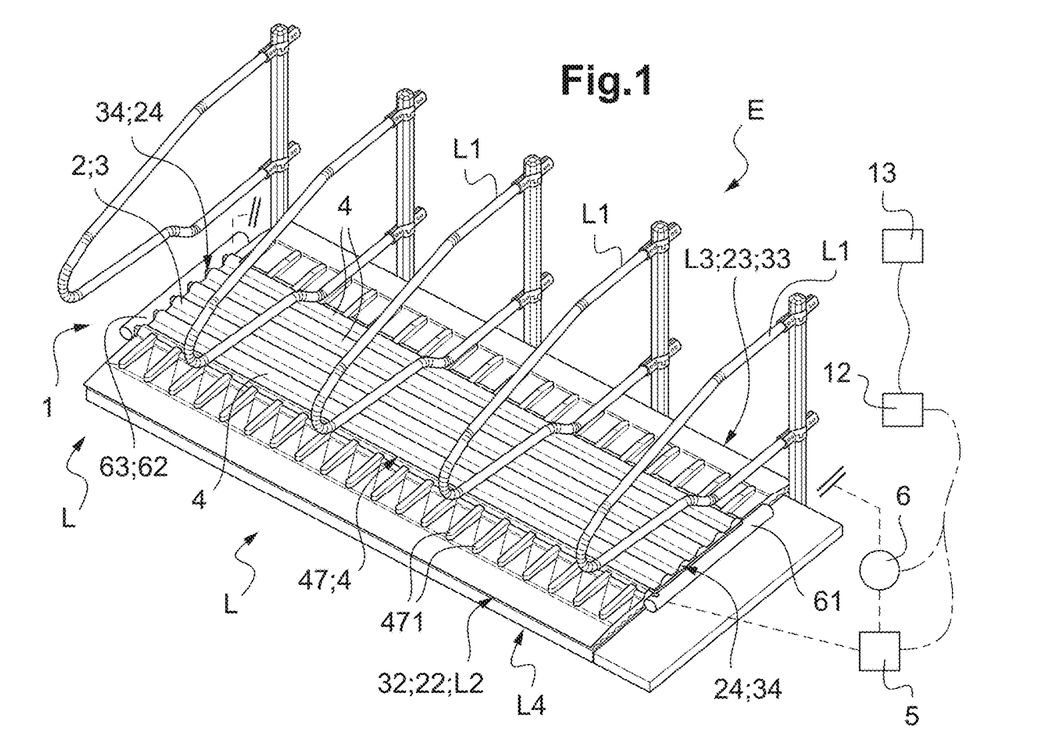
FIG. 1 is a schematic and perspective view of a series of stalls equipped with a comfort system according to the invention, whose comfort mattress consists of a comfort layer made of a resilient material that is surrounded by a resilient layer forming a film.

The comfort system 1 according to the invention is intended to equip a livestock enclosure E in which are arranged bedding boxes (FIG. 1).

The livestock enclosure E advantageously consists of a stable for cattle breeding, in particular dairy cattle and beef cattle.

The bedding boxes herein consist of stalls L, arranged along at least one line.

The stalls L constitute a compromise between a comfortable bedding for the cattle, the respect of the stand-up/lay-down movement, a comfortable standing position and a minimum of stain in the stall.

According to FIG. 1, each stall L, conventional per se, is delimited by:
two lateral partitions L1, for example tubular structures,
a rear sill of the stall L2, extending along an access corridor,
a front limit L3, advantageously comprising an upper bar at the withers and a lower stop (or forward limiter), forming the back of the stall L, and
a ground L4, for example a concrete slab.

Figure 2:
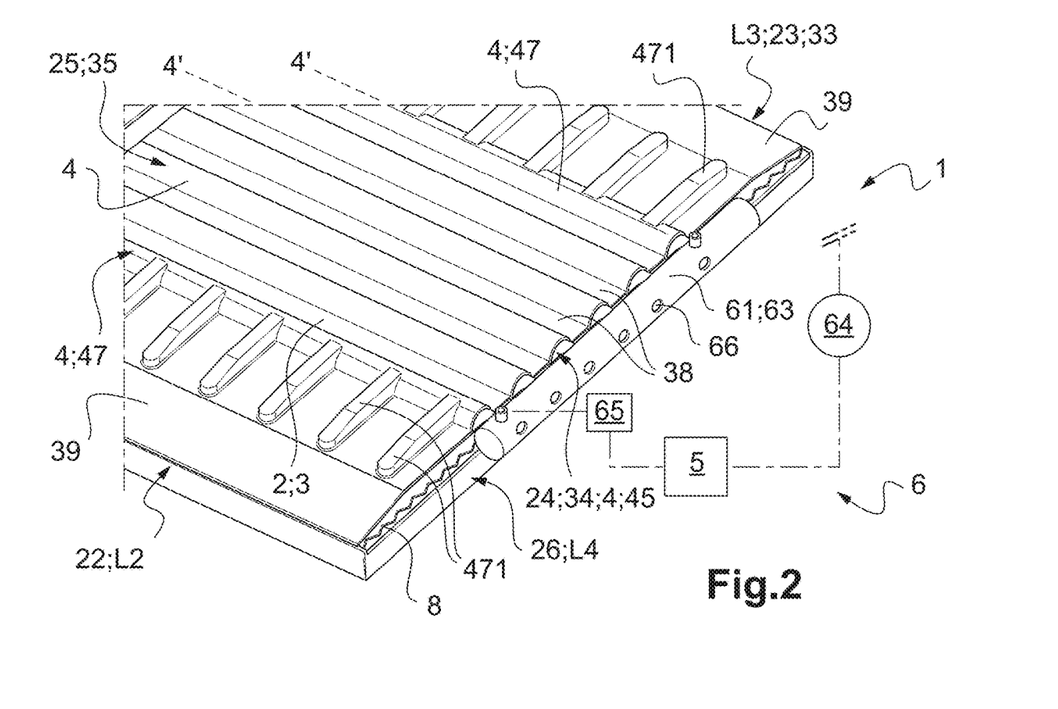
FIG. 2 is a partial and enlarged view of FIG. 1, showing one of the transverse edges of the resilient layer, whose sealed cavities are connected in particular to the circulation means.

The comfort system 1 according to the invention, equipping this series of stalls L, is composed of the following elements:
at least one comfort mattress 2, covering the ground L4 of each of the stalls L and equipped with a resilient layer 3 including several sealed cavities 4 intended to contain a heat-transfer fluid (not shown),
means 5 for regulating the temperature of this heat-transfer fluid (shown in FIGS. 1 and 2), and
means 6 for generating a circulation of the heat-transfer fluid within the sealed cavities 4 of the resilient layer 3 (shown in FIGS. 1 and 2).

The heat-transfer fluid is advantageously chosen among the liquids, for example water or a water/glycol mixture.

Comfort Mattress

Figure 4:
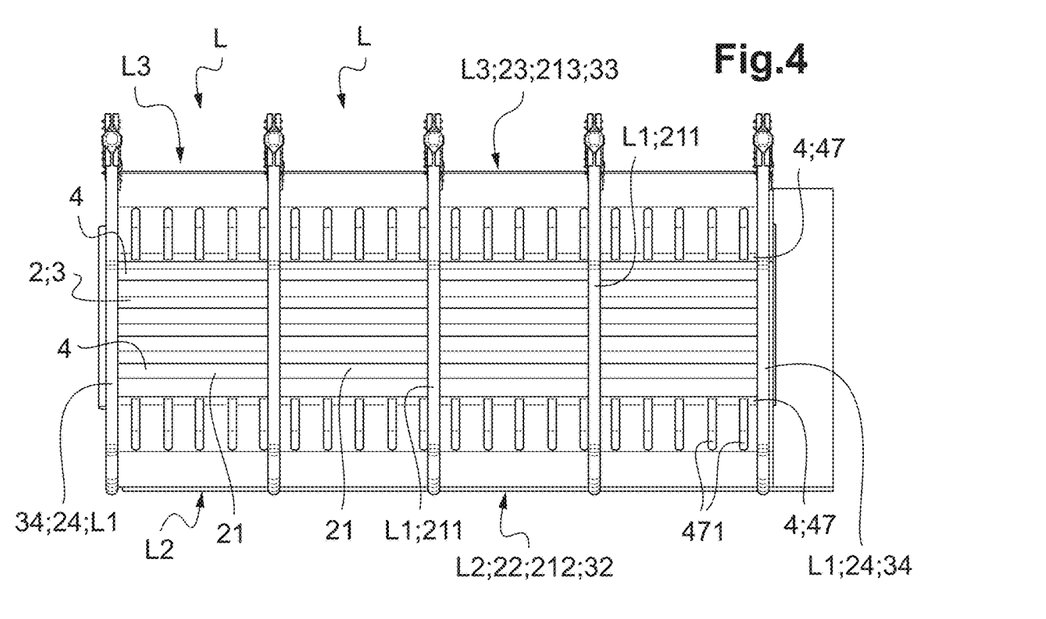
FIG. 4 corresponds to FIG. 1, viewed from above.
Figure 6:
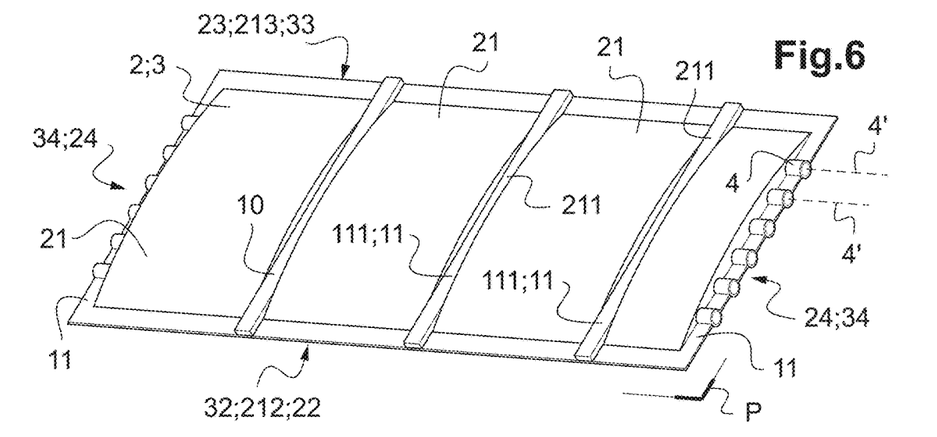
FIG. 6 is a schematic and perspective view of a comfort mattress constitutive of the comfort system according to the invention, wherein said comfort mattress is herein consisted by the resilient layer that includes sealed chambers longitudinally juxtaposed to each other and overlying sealed cavities.
Figure 7:
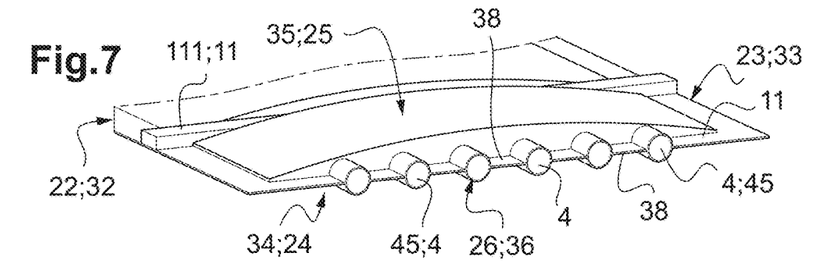
FIG. 7 is a partial and enlarged view of FIG. 6, showing one of the transverse edges of the resilient layer.

The comfort system 1 herein comprises a continuous comfort mattress 2 that covers the ground L4 of the aligned stalls L. This comfort mattress 2 hence includes several accommodation areas 21 that are juxtaposed over the length of said comfort mattress 2 (FIGS. 4 and 6).

As an alternative, not shown, each stall L may contain its own comfort mattress 2 that then defines a single accommodation area 21.

The comfort mattress 2 has a generally rectangular shape that is delimited by two couples of edges, i.e.:
two longitudinal edges, i.e. a rear longitudinal edge 22 intended to extend along the rear sill L2 of the equipped stalls L, and a front longitudinal edge 23 intended to extend along the front limit L3 of the line of stalls L, and
two transverse edges 24, intended to be located at the lateral partitions L1 of the two stalls L, at the end of the line.

The comfort mattress 2 also includes two opposite faces:
an upper face 25, adapted to undergo a elastic deformation and forming the accommodation areas 21 on which the animals are intended to rest, and
a lower face 26, intended to rest on the ground L4 of the stalls L.

Each of the accommodation areas 21 of the comfort mattress 2 is herein intended to accommodate an animal.

Each accommodation area 21 hence corresponds to the surface area on the ground L4 of a stall L, and is laterally delimited by two lateral partitions L1.

Each of the accommodation areas 21 has hence a generally rectangular shape that is delimited by different edges (FIGS. 4 and 6):
two lateral edges 211, each located in vertical alignment with a lateral partition L1 of the stall L,
a rear edge 212, adjoining the rear sill L2 of the stall L (forming a portion of the rear longitudinal edge 22 of the comfort mattress 2), and
a front edge 213, adjoining the front limit L3 of the stall L (forming a portion of the front longitudinal edge 23 of the comfort mattress 2).

Resilient Layer of the Comfort Mattress

According to the invention, the resilient layer 3 may form either a portion of the comfort mattress 2 (FIGS. 1 to 5), or the whole comfort mattress 2 (FIGS. 6 to 9).

In all the cases, this resilient layer 3 also has a generally rectangular shape that is delimited by two couples of edges:
- two longitudinal edges, a rear one 32 and a front one 33, positioned respectively at the rear 22 and front 23 longitudinal edges of the comfort mattress 2, and
- two transverse edges 34, positioned respectively at the transverse edges 24 of the comfort mattress 2.

The resilient layer 3 has also two opposites faces:
- an upper face 35, intended to form the upper face 25 of the comfort mattress 2, and
- a lower face 36, possibly forming the lower face 26 of the comfort mattress 2.

This resilient layer 3 is made of at least one material adapted to undergo an elastic deformation, also called "resilient material", chosen among:
- the elastomeric materials, i.e. for example natural rubber, "synthetic natural" rubber (or synthetic poly-isoprene), polybutadiene or styrene-butadiene, or
- the plastic materials or thermoplastic elastomers (TPE), i.e. for example PVB (polyvinyl butyral), ABS (acrylonitrile butadiene styrene)/SBR (styrene-butadiene), PP (polypropylene)/EPDM (ethylene-propylene-diene monomer), TPU (polyurethane TPE).

This resilient layer 3 is advantageously made single-piece, either single-material (one material) or multi-material (with at least two superimposed sub-layers made of different materials).

The resilient layer 3 may also contain reinforcement sub-layers described hereinafter in relation with FIGS. 5 and 9, chosen among textile fibres, metal fibres or any other product offering stability and/or elongation resistance.

These reinforcement sub-layers consist for example of a fabric insert/frame serving as a reinforcement, advantageously made of a material chosen among nylon, cotton, polyester, polyamide or any other reinforcement fabric.

The resilient layer 3 includes the sealed cavities 4 within its thickness and within its constitutive material. The resilient layer 3, and in particular the constitutive material thereof, hence defines directly the sealed cavities 4.

The sealed cavities 4 are juxtaposed to each other and each underlie a portion of the accommodation areas 21 of the comfort mattress 2. In other words, the accommodation areas 21 of the comfort mattress 2 overlie the sealed cavities 4 present.

For that purpose, the sealed cavities 4 each consist of a tubular structure having an elongated rectilinear shape, defining a longitudinal axis 4'.

These sealed cavities 4 are herein six in number. Generally, the number of sealed cavities 4 is advantageously comprised between 5 and 10.

The sealed cavities 4 are distributed over a plane P extending parallel to the surfaces 25, 26 of the comfort mattress 2.

These sealed cavities (in particular their respective longitudinal axes 4') hence extend parallel, or at least approximately parallel, with respect to the surfaces 25, 26 of the comfort mattress 2.

The sealed cavities 4 also each extend over the whole length of the resilient layer 3, between the transverse edges 34 thereof (and advantageously over the whole length of the comfort mattress 2); and the sealed cavities 4 are distributed over the width of the resilient layer 3, between the longitudinal edges 32, 33 thereof (and advantageously over the width of the comfort mattress 2).

These sealed cavities 4 (in particular their respective longitudinal axes 4') hence extend parallel, or at least approximately parallel, relative to each other and with respect to the longitudinal edges 32, 33 of the resilient layer 3.

Each sealed cavity 4 hence includes a succession of sections extending between the lateral edges 211 of each accommodation area 21, perpendicular to these latter.

These sealed cavities 4 are herein separated from each other by a rectangular interlayer band 38.

Figure 3:
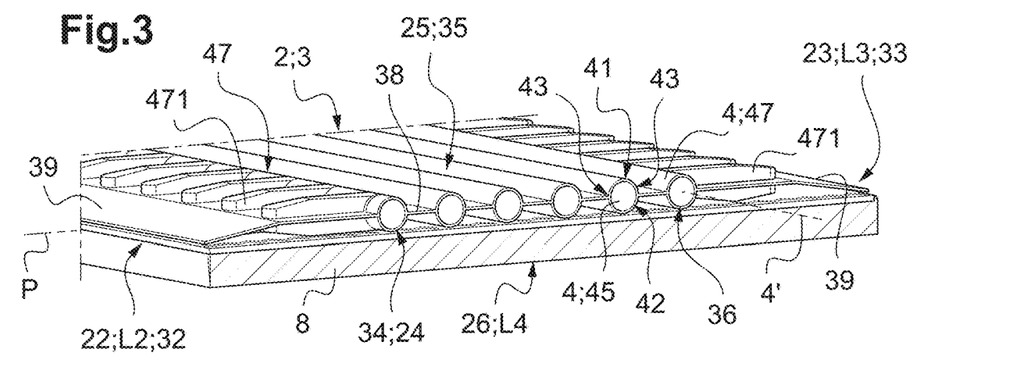
FIG. 3 is a perspective, almost side view, of one of the transverse edges of the resilient layer, with the circulation means hidden.
Figure 8:
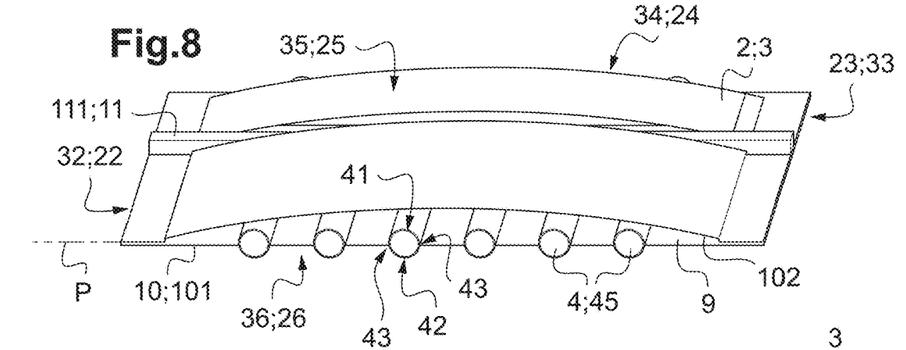
FIG. 8 is a sectional view of the resilient layer according to FIGS. 6 and 7, according to a cutting plane parallel to the transverse edges thereof.

Moreover, each sealed cavity 4 is delimited by two opposite surfaces, an upper surface 41 and a lower surface 42, that meet each other at two lateral edges 43 (FIGS. 3 and 8).

Each sealed cavity 4 has herein a vertical cross-section that, in the empty state (not shown), is of flat or planar shape: the distance between the lateral edges 43 (width) is higher than the distance between the opposite upper 41/lower 42 surfaces thereof (height).

When the sealed cavity 4 is filled with fluid, the vertical cross-section thereof is for example round, oval or elliptic, as a function in particular of the fluid pressure, with:
- the upper 41/lower 42 surfaces, which are curved, concave, and
- a long axis (passing by the lateral edges 43 thereof), which extends parallel to the faces 25, 26 of the comfort mattress 2.

By way of indication only, in the empty state, the sealed cavities 4 have advantageously a width, between their respective two lateral edges 43, comprised between 70 and 100 mm.

The sealed cavities 4 are moreover spaced apart by a distance comprised between 80 and 130 mm.

These sealed cavities 4, filled with fluid, each have for example a height (along their vertical short axis) comprised between 60 and 100 mm.

The sealed cavities 4 are each intended to contain the heat-transfer fluid that is put into circulation along their respective lengths, to regulate the temperature of the upper face 25 of the comfort mattress 2.

For that purpose, each of the sealed cavities 4 is terminated by two through-orifices 45 that are each arranged at one of the transverse edges 34 of the resilient layer 3.

These through-orifices 45 allow a fluid connection with the means 5 for regulating the temperature and with the means 6 for generating the circulation of the heat-transfer fluid.

The sealed cavities 4 are herein fluidically independent from each other. In this case, the piercing of one of the sealed cavities 4 would not cause the emptying of the whole sealed cavities of the resilient layer 3.

Each of the sealed cavities 4 hence includes two through-orifices 45 that are peculiar to it, for the circulation of the heat-transfer fluid.

The through-orifices 45 herein open directly at the transverse edges 35 of the resilient layer 3. As an alternative, not shown, the through-orifices 45 on a same side open into a duct formed in the resilient layer 3, itself opening at an edge of said resilient layer 3.

The through-orifices 45 are advantageously obtained by a cutting of the resilient layer 3 at length, along a cut line oriented perpendicular to the longitudinal edges 32, 33.

Indeed, the resilient layer 3, before its installation, is advantageously stored as a roll having of length of several metres, in particular higher than 3 m long.

This roll embodiment has for interest to allow a simple and fast installation of the resilient layer 3 within the livestock enclosure, by unwinding along a line of stalls L then cutting at the desired length for this line.

Moreover, the thickness of the material forming the sealed cavity 4 (in particular its thickness at the upper surface 43 thereof) is advantageously minimum, for example comprised between 2 and 5 mm, to favour the thermal transfer by a phenomenon of conduction through said material.

Two particular embodiments of this comfort mattress 2 according to the invention will now be described.

First Embodiment of the Comfort Mattress

A first embodiment of the comfort mattress 2 according to the invention is illustrated in FIGS. 1 to 5.

The general structure of this comfort mattress is for example of the "Louisiane" type, marketed by the company BIORET AGRI-LOGETTE CONFORT (Nort sur Erdre, France).

According to this first embodiment, the comfort mattress 2 includes a lower comfort layer 8 consisted by a resilient material plate, for example a plate of rubber granulates (aggregated or not, or of latex) (visible on FIGS. 2 and 3).

The comfort layer 8 then forms the lower face 26 of the comfort mattress 2.

This comfort layer 8 is enveloped in the resilient layer 3 forming a film, which replaces a conventionally implemented film (for example, elastomeric material, PVC or fabric).

Such an embodiment is interesting in particular in a "renovation" use, in which the used film is replaced and an additional function of thermal comfort is simultaneously provided.

This resilient layer 3 hence includes the two following faces:
  the upper face 35 forming the upper face 25 of the comfort mattress 2, and
  the lower face 36, enveloping the comfort layer 8.

Preferably, the final thickness of the resilient layer 3 (once its sealed cavities 4 filled) is approximately twice the initial thickness of this resilient layer 3 (before filling).

For example, the initial thickness of the resilient layer 3 is of the order of 5 to 10 mm.

The sealed cavities 4 have a continuous section over their respective lengths.

However, the sealed cavities 4 extending along the longitudinal edges 32, 33, respectively, of the resilient layer 3, also called "peripheral sealed cavities 47", each include a plurality of transverse extensions 471.

The transverse extension 471 are distributed over the length of their respective peripheral sealed cavities 47.

These transverse extension 471 each extend perpendicular to the longitudinal axis 4' of the associated peripheral sealed cavity 47 and towards the juxtaposed longitudinal edge 32, 33.

By way of indication, these transverse extensions 471 each have a (front/rear) length comprised between 300 and 500 mm.

Such structures allow obtaining an upper face 35 whose temperature is controlled, while forming a relief extending along a front/rear direction to avoid a phenomenon of retention of the biological matters produced by the bovine (milk, dejections, urine, etc.).

That way, the draining of these biological matters out of the comfort mattress 2 is favoured.

This resilient layer 3 is advantageously fastened to the ground through profiles of the bar type (not shown), fixed by brads or nails, in particular along the front 23 and rear 22 edges of the comfort mattress 2.

For that purpose, the resilient layer 3 advantageously includes two longitudinal bands 39, a front one and a rear one, which are devoid of sealed cavities 4 and which are intended to cooperate with theses bars.

These longitudinal bands 39 have for that purpose, for example, a width comprised between 100 and 300 mm.

Second Embodiment of the Comfort Mattress

A second particular embodiment of the comfort mattress 2 is illustrated in FIGS. 6 to 9.

According to this second embodiment, the comfort mattress 2 is consisted directly by the resilient layer 3 that includes:
  the sealed cavities 4 that are distributed over the plan P located on the side of the lower face 26, 36 resting on the ground, and
  several sealed chambers 9 (or sealed pockets), each filled with a damping fluid and overlying these sealed cavities 4 (one of these sealed chambers 9 is visible in FIG. 8).

This resilient layer 3 hence includes the upper 35 and lower 36 faces, which form the upper 25 and lower 26 faces, respectively, of the comfort mattress 2.

This resilient layer 3 is herein formed by superimposition of two skins 10 (FIG. 8):
  a lower skin 101, in which are formed the sealed cavities 4, and
  an upper skin 102, made integral with the lower skin 101 at the respective perimeter thereof, to delimit the sealed chambers 9.

The thermal regulation between the sealed cavities 4 and the upper face 35 of the resilient later 3 is then performed via the sealed chambers 9, by a phenomenon of thermal convection ensured by the damping fluid.

Preferably, each accommodation area 21 then includes one of these sealed chambers 9, that is peculiar to it.

The resilient layer 3 hence includes a succession of juxtaposed sealed pockets 9, that each correspond to one of the accommodation areas 21.

Each sealed chamber 9 includes, viewed from above, a rectangular perimeter corresponding at least approximately to the surface area of a stall L.

The fluid intended to fill each sealed chamber 9 is advantageously chosen among the water, a gas (in particular, air), a gel.

Each sealed chamber 9 is for that purpose associated with a through-orifice (not shown) for the access thereto, in particular for the filling and/or the draining thereof, for example an orifice equipped with a valve.

The valve is tightly connected to the through-orifice, for example via a metal crimp.

The fluid filling the sealed chamber 9 is fixed, i.e. with no phenomenon of circulation between two orifices (contrary to the heat-transfer fluid filling the sealed cavities 4).

Each sealed chamber 9 is hence individual, and is intended to recover its shape when the animal withdraws.

The upper surface of each sealed chamber 9 has advantageously a cross-section (along a plane parallel to the transverse edges 24—FIG. 8) that has a generally convex curved shape.

This particular shape forms front and rear slopes that favour the draining of the biological matters out of said comfort mattress 3.

Two juxtaposed sealed chambers 9 are separated by a transverse band 11 extending between the longitudinal edges 22, 23.

These transverse bands 11 have two functions:
they form the lines for the cutting at length of the resilient layer 3, so as to obtain the through-orifices 45, and
they are intended to be covered by a transverse fixation element 111, for example a baseboard, to allow a fixation of the resilient layer 3 while ensuring the passage of the heat-transfer fluid.

Preferably, the final thickness of the lower skin 101 (once its sealed cavities 4 filled) is approximately twice its initial thickness (before filling).

For example, the initial thickness of the lower skin 101 is of the order of 5 to 10 mm.

Still preferably, the final thickness of a sealed chamber 9 (herein at the rise thereof) is advantageously comprised between 10 and 50 mm.

Still preferably, the initial thickness of the resilient layer 3 (before filling) is comprised between 6 and 20 mm.

The sealed chambers 9 have for example a width (parallel to the longitudinal edges 22, 23) of the order of 1 m; and the transverse bands 11 have advantageously a width of the order of 100 mm.

Generally, the sealed chambers 9 have for interest to constitute damping elements, or buffers, extending above the sealed cavities 4.

Each sealed chamber 9 ensures a distribution of the weight of the animal within the accommodation area 21, and hence allows reducing significantly the bearing efforts exerted on the sealed cavities 4.

The risk of plugging, or deterioration, of the sealed cavities 4 by a phenomenon of crushing is hence significantly reduced. It is hence possible to reduce the pressure within the sealed cavities 4.

Heat-Transfer Fluid Circulation Means

Moreover and generally, the comfort system 1 includes the means 6 for generating the circulation of the heat-transfer fluid, also called "circulation means" (FIGS. 1 and 2 show an implementation for the first embodiment; identical connections are made for the implementation of the second embodiment).

These circulation means 6 ensure a distribution and a parallel circulation of the heat-transfer fluid, along the sealed cavities 4.

These circulation means 6 comprise for that purpose:
upstream fluid connection means 61, for fluid supply, which are connected in parallel to the through-orifices 45 of the sealed cavities 4 located at a first transverse edge 34 of the resilient layer 3, and
downstream fluid connection means 62, for collecting the fluid at the exit, which are connected in parallel to the through-orifices 45 of the sealed cavities 4 located at a second transverse edge 34 of the resilient layer 3.

The upstream 61/downstream 62 fluid connection means each include in particular a device of the perforated-tube (manifold) type 63, in order to ensure the parallel circulation of the heat-transfer fluid within each of the sealed cavities 4.

The connection of a perforated tube 63 with the adjoining through-orifices 45 is advantageously performed through conventional mechanical sealing means.

These upstream 61/downstream 62 fluid connection means may be fluidically connected to each other for the recirculation or the recycling of this heat-transfer fluid.

The circulation means 6 also comprise a pump 64, to cause the circulation of the heat-transfer fluid.

The upstream fluid connection means 61 are advantageously equipped with pressure regulation means 65 and/or flow regulation means 66.

Hence, the pressure within the sealed cavities 4 is advantageously adjusted between 0.3 and 3 bars, preferably between 1 and 1.5 bars.

The upstream fluid connection means 61 are moreover advantageously equipped with means 66 for regulating the flow rate within each of the sealed cavities 4.

Temperature Regulation Means

The means 5 for regulating the temperature of the heat-transfer fluid (also called "regulation means 5") equip the circulation means 6, advantageously at the upstream fluid connection means 61.

These regulation means 5 are chosen among means adapted to heat up and/or cool down the heat-transfer fluid.

For example, these regulation means 5 consist in a reversible heat pump with temperature measurement.

The regulation means 5 advantageously comprise:
means for measuring the temperature of this heat-transfer fluid, for example a temperature probe, and
possibly, means for displaying the temperature measured.

These regulation means 5 are optional, in particular in the case where the heat-transfer fluid is initially at the desired temperature (for example, a source of fresh water for cooling down the comfort mattress 2).

Control Means

The comfort system 1 also advantageously includes control means 12 for piloting the operation of the regulation means 5 and of the circulation means 6.

These control means 12 are chosen for example among:
manual control means,
control means of the scheduler type (for an operation according to predefined cycles), and
automatic control means, in particular advantageously a computer program executed by a computer.

These control means 12 are then advantageously also connected with means 13 for measuring the temperature within the livestock enclosure E.

Operation

In order to prevent a potential thermal stress, the control means 12 may pilot automatically the regulation means 5 and the circulation means 6, advantageously taking into account the ambient temperature within the livestock enclosure E acquired by the measurement means 13.

In the presence of unfavourable surrounding thermal conditions, the control means 12 then generate:
a circulation of the heat-transfer fluid in the sealed cavities 4 of the comfort mattress(es) 2 by means the circulation means 6, and
a regulation of the temperature of the heat-transfer fluid by means of the regulation means 5,
so as to adjust the temperature of the upper face 25 of the comfort mattress 2.

The circulation of the heat-transfer fluid in the sealed cavities 4 is herein performed in parallel: the flow of heat-transfer fluid is split so as to pass through these sealed cavities 4 in a simultaneous manner.

This circulation of heat-transfer fluid is also performed in a same direction within the juxtaposed sealed cavities 4: the fluid then circulates from the through-orifices 45 located at a first transverse edge 34 of the resilient layer 3 (on the right in FIG. 1) to the through-orifices 45 located at a second transverse edge 34 of the resilient layer 3 (on the left in FIG. 1).

In cooling-down mode, the heat-transfer fluid may be naturally cold (for example, a source of water at a temperature comprised between 1° C. and 15° C.) or it may be cooled down by the regulation means 5. The comfort system 1 according to the invention hence allows providing directly a reduction of the temperature of the animal within its stall L.

Hence, in power-on configuration, the comfort system 1 according to the invention allows cooling down the upper face 25 of the comfort mattress 2, which cools down the hair coat of the cow and which limits the increase of its body temperature.

On the reverse, in heating mode, the heat-transfer fluid is heated up. The comfort system 1 according to the invention allows providing directly heat to the animal inside its stall L.

When the risk of thermal stress is eliminated, the control means 12 automatically pilot the stopping of the circulation 6 and regulation 5 means.

Manufacturing of the Resilient Layer

The resilient layer 3 according to the invention may be manufactured by assembly of a sub-set of superimposed layers, to form a unit of the single-piece type.

The technology of assembly may be chosen for example among—vulcanization, —bonding, —welding.

Figure 5:
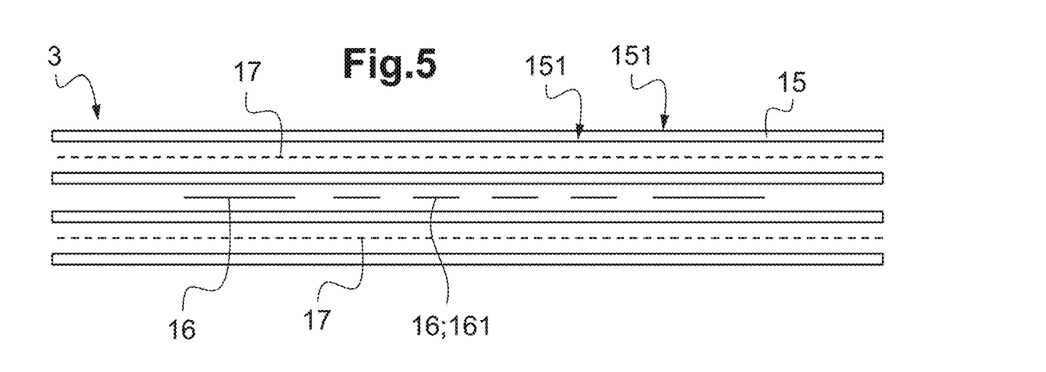
FIG. 5 is a schematic and side view of the different parts intended to be assembled to constitute the resilient layer of the comfort system according to FIGS. 1 to 4.
Figure 9:
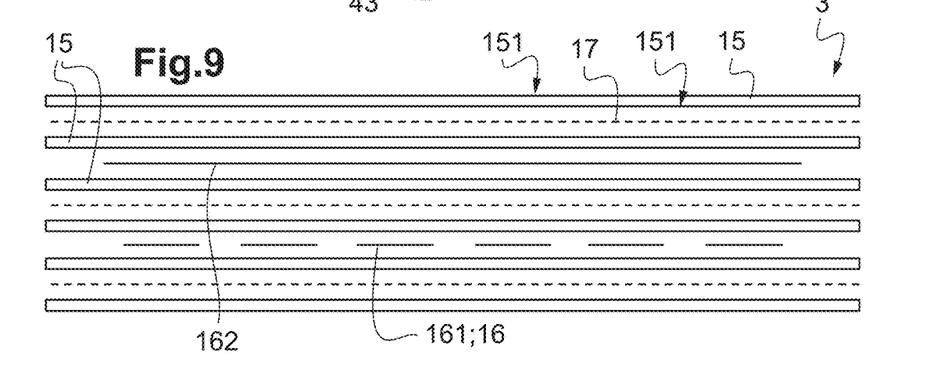
FIG. 9 is a schematic side view of the different parts intended to be assembled to constitute the resilient layer of the comfort system according to FIGS. 6 to 8.

As illustrated in FIG. 5 for the first embodiment and in FIG. 9 for the second embodiment, the method for manufacturing the resilient layer 3 comprises:

(i) a step of superimposing sub-layers of elastomeric material 15 including two opposite surfaces 151, between which are added:
   interlayer means 16 adapted to prevent locally the fastening together of the opposite surfaces 151 of said layers 15 to form the sealed cavities 4 and, as the case may be, the sealed chambers 9, and
   possibly, reinforcement layers 17, then (ii) a step of fastening the surfaces 151 in contact of said superimposed sub-layers 15 (i.e. outside the outline of the interlayer means 16), so that the interlayer means 16 form the sealed cavity 4 and, as the case may be, the sealed chambers 9.

The interlayer means 16 consist of any means avoiding the fastening together of the opposite surfaces 151 of the layers 15 to be assembled.

In the case of a vulcanization, the interlayer means 16 consist for example of bands or tubes that are advantageously made of a material chosen among:
   a fire-protection film containing a retardant, for example made of polypropylene, acrylonitrile butadiene styrene,
   a layer of silicone,
   a layer of a vulcanized elastomeric material, for example a pipe made for example of styrene-butadiene rubber (SBR), natural rubber (NR), or ethylene propylene diene monomer.

These interlayer means 16 are in particular arranged between two elastomeric layers 15 to be assembled to each other.

Generally, these interlayer means 16 are bespoke distributed, as a function of the desired arrangement for the sealed cavities 4 and, as the case may be, the sealed chambers 9.

Herein, as illustrated in FIG. 5 for the first embodiment, the step of superimposition comprises a superimposition of four sub-layers of elastomeric material 15 with a sub-layer of interlayer means 16 that is added between two of said sub-layers of elastomeric material 15.

The sub-layer of elastomeric material 16 includes several bands 161 that are juxtaposed over the width of the two sub-layers of elastomeric material 15 to form the juxtaposed sealed cavities 4 (including the peripheral sealed cavities 47).

As illustrated in FIG. 9 for the second embodiment, the step of superimposition comprises a superimposition of six sub-layers of elastomeric material 15 with two sub-layers of interlayer means 16 that are each added between two sub-layers of elastomeric material 15.

In particular:
   a lower sub-layer includes several bands 161 that are juxtaposed over the width of the sub-layers of elastomeric material 15 to form the juxtaposed sealed cavities 4, and
   an upper sub-layer includes several rectangles 162 that are distributed over the length of the sub-layers of elastomeric material 15, to form the sealed chamber 9.

Generally, the comfort system according to the invention has for interest to implement comfort mattresses whose upper face is optimally regulated in temperature, so as to ensure an optimum thermal comfort for the animals.

The comfort mattresses have for interest to be installed in a conventional way, advantageously by being unwound from a wall to another.

The surface pressure on the animal is reduced with respect to a bedding on a concrete structure. The blood circulation of the animal is improved.

The invention claimed is:

1. A system for thermal comfort of animals in a livestock enclosure, comprising:
   (a) at least one comfort mattress (2) that comprises at least one resilient layer (3) and that has two opposite faces:
      an upper face (25), adapted to undergo an elastic deformation and including at least one accommodation area (21) on which an animal is intended to rest, and
      a lower face (26), intended to rest on a receiving surface (L4),
   wherein said at least one resilient layer (3) includes several sealed cavities (4) intended to contain a heat-transfer fluid,
   wherein said sealed cavities (4) underlie at least one portion of said at least one accommodation area (21), and
   wherein said sealed cavities (4) extend parallel, or at least approximately parallel, relative to each other, and each include at least two through-orifices (45),
   (b) a heat-transfer fluid, intended to fill said sealed cavities (4), and
   (c) means (6) for generating a circulation of said heat-transfer fluid within each of said sealed cavities (4), between their respective through-orifices (45).

2. The system for thermal comfort of animals according to claim 1, wherein the sealed cavities (4) each have an elongated rectilinear shape.

3. A livestock enclosure equipped with a comfort system (1) according to claim 2.

4. The system for thermal comfort of animals according to claim 1, wherein said sealed cavities (4) are distributed over at least one plane (P) extending parallel to the faces (25, 26) of said at least one comfort mattress (2).

5. A livestock enclosure equipped with a comfort system (1) according to claim 4.

6. The system for thermal comfort of animals according to claim 1, wherein said at least one resilient layer (3) includes two longitudinal edges (32, 33), and wherein said sealed cavities (4) extend parallel, or at least approximately parallel, to said longitudinal edges (32, 33).

7. The system for thermal comfort of animals according to claim 6, wherein the sealed cavities (4) comprise two peripheral sealed cavities (47) that are juxtaposed along said longitudinal edges (32, 33), and wherein one at least of said peripheral sealed cavities (47) includes transverse extensions (471), distributed over the length thereof, that extend perpendicular to the longitudinal axis (4') of said peripheral sealed cavity (471) and towards said juxtaposed longitudinal edge (32, 33).

8. A livestock enclosure equipped with a comfort system (1) according to claim 7.

9. A livestock enclosure equipped with a comfort system (1) according to claim 6.

10. The system for thermal comfort of animals according to claim 1, wherein said at least one resilient layer (3) includes two transverse edges (34), and wherein the two through-orifices (45) of the sealed cavities (4) are each arranged at one of said transverse edges (34).

11. They system according to claim 10, wherein the means (6) for generating a circulation of said heat-transfer fluid consists of means for generating a parallel circulation within said sealed cavities (4), between said through-orifices (45).

12. The system for thermal comfort of animals according to claim 1, further comprising at least two of said accommodation areas (21), wherein said sealed cavities (4) underlie a portion of each of said accommodation areas (21).

13. The system for thermal comfort of animals according to claim 1, wherein said at least one resilient layer (3) includes at least one sealed chamber (9), intended to contain a damping fluid and arranged between said sealed cavities (4) and said upper face (25) of said mattress (2), wherein said at least one resilient layer (3) includes at least one through-orifice for the access to said at least one sealed chamber (9).

14. The system for thermal comfort of animals according to claim 1, wherein said at least one resilient layer (3) forms a film surrounding a comfort layer (8) made of a resilient material.

15. The system for thermal comfort of animals according to claim 1, further comprising means (5) for regulating the temperature of said heat-transfer fluid.

16. The system for thermal comfort of animals according to claim 15, wherein the heat regulation means (5) are chosen among means adapted to heat up and/or cool down said heat-transfer fluid.

17. The system for thermal comfort of animals according to claim 1, wherein said at least one resilient layer (3) is made single-piece, said resilient layer (3) defining directly said sealed cavities (4) and, as the case may be, said at least one sealed chamber (9).

18. A livestock enclosure equipped with a comfort system (1) according to claim 1.

19. The livestock enclosure according to claim 18, comprising stalls (L), wherein said at least one comfort mattress (2) covers the ground (L4) of one at least of said stalls (L), and said at least one comfort mattress (2) includes a plurality of sealed cavities (4) that extend within at least one of said stalls (L).

20. A method for improving the thermal comfort of the animals in a livestock enclosure according to claim 18, wherein said method comprises:

a circulation of the heat-transfer fluid within said sealed cavities (4) of said at least one comfort mattress (2), and possibly a regulation of the temperature of said heat-transfer fluid, for regulating the temperature of the upper face (25) of said at least one comfort mattress (2).

* * * * *